United States Patent [19]

Brunet et al.

[11] Patent Number: 5,261,202
[45] Date of Patent: Nov. 16, 1993

[54] DEVICE FOR FIXING A PLATE GLASS ON A SUPPORT SUBJECTED TO VIBRATION IN PARTICULAR A DISPLAY SCREEN FOR AN AIRCRAFT INSTRUMENT PANEL

[75] Inventors: Pascal Brunet, le Bouscat; Jean N. Klaver, Bordeaux, both of France

[73] Assignee: Sextant Avionique, Meudon la Foret, France

[21] Appl. No.: 974,226

[22] Filed: Nov. 10, 1992

[30] Foreign Application Priority Data

Nov. 13, 1991 [FR] France .................. 91 13945

[51] Int. Cl.⁵ .............................................. E06B 3/26
[52] U.S. Cl. ...................................................... 52/202
[58] Field of Search ................. 248/544, 909; 52/790, 52/305, 171, 172, 204, 208, 202, 203; 411/546, 547, 535, 536; 188/201; 384/626; 29/238, 807, 525.1

[56] References Cited

U.S. PATENT DOCUMENTS

| | | | |
|---|---|---|---|
| 2,124,866 | 7/1938 | Young | 384/626 |
| 2,542,405 | 2/1951 | Fink | 384/626 |
| 4,526,641 | 7/1985 | Schriever et al. | 384/626 |
| 4,783,938 | 11/1988 | Palmer | 52/790 |

FOREIGN PATENT DOCUMENTS

| | | |
|---|---|---|
| 435343 | 7/1991 | European Pat. Off. . |
| 2379087 | 8/1978 | France . |
| 2453743 | 11/1980 | France . |

*Primary Examiner*—Mark Rosenbaum
*Assistant Examiner*—David P. Bryant
*Attorney, Agent, or Firm*—Cushman, Darby & Cushman

[57] ABSTRACT

A display screen assembly comprises a glass plate having first and second sides and first and second flexible gaskets. The first gasket is adapted to be disposed along an outer periphery of the first side of the glass plate. The second gasket is adapted to be disposed along an outer periphery of the second side of the glass plate. First and second support elements are provided. Each of the support elements has at least a portion thereof adapted to abut against the first and second gaskets respectively. A rigid block of adjustable thickness is adapted to be positioned between the first and second support elements. A clamping means clamps the first and second support elements together so as to compress the rigid block therebetween and to compress the gaskets against the glass plate. The block of adjustable thickness is operable to determine the extent to which the gaskets are compressed.

18 Claims, 1 Drawing Sheet

DEVICE FOR FIXING A PLATE GLASS ON A SUPPORT SUBJECTED TO VIBRATION IN PARTICULAR A DISPLAY SCREEN FOR AN AIRCRAFT INSTRUMENT PANEL

The present invention relates to a device that uses mechanical clamping means for fixing a plate glass between two rigid support elements that form frames. The invention also relates to such devices which are designed in particular for environments subject to high levels of vibration.

The invention is particularly applicable in implementing flat LCD/LED type screens used in displays mounted on the instrument panel of civil or military aircraft.

Naturally, the field of the invention can be extended to the lenses of optical assemblies, or to portholes, windscreens and the like.

BACKGROUND OF THE INVENTION

In such applications for special environments, a plate glass is presently fixed by adhesive or by being pressed between two mechanical holding parts that form frames.

The major drawback encountered in such methods of assembly is that it is not possible to control the resonant frequencies of vibrations in the plate glass. Rather, the vibration of the plate glass is directly influenced by the resonant frequencies of the materials used in the assembly, and more particularly the materials of the support elements and the fixing means which are both rigid.

There is thus a danger that the frequencies of the plate glass may correspond to the frequencies of some other mechanical component of the fixing assembly which can give rise to coupling and to runaway vibration thereof. This can lead to the breaking of the plate glass.

Naturally, in making the invention, steps were initially taken to interpose a flexible gasket in the rabbet of the rigid frame-forming support elements, i.e. between the rabbet and the outer margin of the plate glass, and to do so on both sides.

Vibration tests show that although flexible gaskets perform well in damping vibration and in absorbing differential expansion between the glass and its support, they are often inadequate for governing the frequencies of vibrations that take place in the plate glass since it is not possible to control the clamping means acting on the gaskets. As a result the gaskets randomly compressed to a greater or lesser extent.

In order to solve this second problem, the invention proposes not only to decouple the resonant frequencies of the plate glass from those of the other mechanical parts, but also to appropriately select the frequencies of the plate glass by controlling the clamping thereof. Such clamping is controlled without special precautions having to be taken by the assembly operator. The present invention also protects the plate glass from breakage in the event that too much torque is applied to the clamping means during assembly.

SUMMARY OF THE INVENTION

To this end, the invention provides a fixing device that uses mechanical clamping means for fixing a plate glass, made of glass material, between two rigid support elements forming frames. The invention is designed in particular for environments subject to high levels of vibration, wherein the plate glass is pressed between the two support elements by two peripheral flexible gaskets respectively disposed between the inside faces of the support elements and the adjacent faces of the glass. The compression of the gaskets is controlled by interposing at least one rigid block, of adjustable thickness between the support elements. The elements come into abutment against the block when nominal torque is applied to the mechanical clamping means. The clamping means, thereby, selectively the flexible gaskets in such a manner so as to adjust the resonant frequency of vibration of the plate glass without interference from the resonant frequencies of vibration of the other mechanical parts.

In a preferred embodiment, the rigid block of adjustable thickness includes a laminated assembly of sheets, of a predetermined thickness, that can be split apart.

BRIEF DESCRIPTION OF THE DRAWING

An embodiment of the invention is described by way of example with reference to the accompanying drawings, in which.

DETAILED DESCRIPTION

Figure 1:
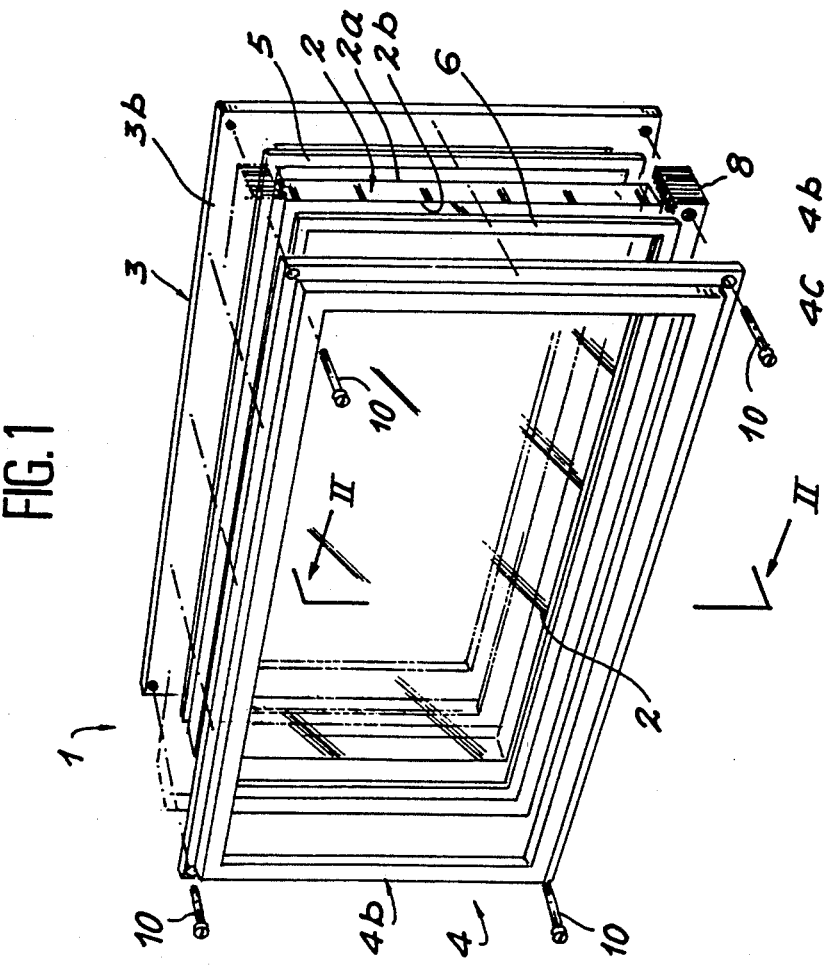
FIG. 1 is an exploded perspective view of a glass fixing device of the invention.
Figure 2:
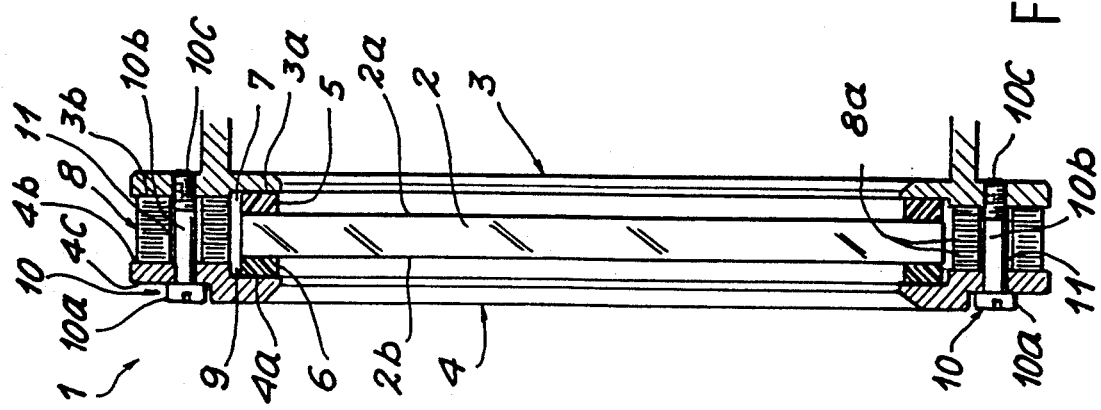
FIG. 2 is a section view along line II—II of FIG. 1, after the elements have been assembled.

By way of example, the figures show a fixing device 1 for an LCD type flat screen 2 specifically adapted for displays mounted on the instrument panel of civil or military aircraft.

The fixing device comprises a load-bearing structure of aluminum including a rigid support element 3 of rectangular shape on which a plate glass 2 (or sheet of glass), of identical peripheral shape but of smaller dimensions is placed via a first flexible peripheral gasket 5 placed in a rabbet 7 of the support element 3 between a peripheral zone of the face 2a of the plate glass 2 and an inside face 3a of the support element 3 constituting a portion of the rabbet 7.

In a logical assembly order, a rigid block 8 of adjustable thickness is then placed on an inside face 3b of the element 3 close to its outer margin.

A second flexible peripheral gasket 6, identical to the first gasket 5, is placed on a peripheral zone of the face 2b of the plate glass 2. Gasket 6 is received in a rabbet 9 of a second rigid support element 4 made of steel. Support element 4 forms a frame and overlies both the gasket 6, via an inside face 4a constituting a portion of its rabbet 9, and the rigid block 8 by means of its inside face 4b situated close to its outer margin and facing the inside face 3b of the other element 3.

With the component parts of the device 1 thus put temporarily into place, mechanical clamping means for the assembly are put into operation.

The mechanical clamping means include screws 10 having heads 10a that bear against a peripheral outside face 4c of the frame-forming element 4. Screws 10 have shanks 10b passing through the face 4c and through holes 11 that pass through the elements 3 and 4 and through the block 8.

The screws 10 are then tightened in succession by screwing their threaded ends 10c into corresponding threaded portions formed in the periphery of the support element 3 at holes 11 therethrough.

According to the invention, this tightening is performed without taking special precautions and by applying a nominal torque to the screws 10. The support elements 3 and 4 are thereby into abutment against the rigid block 8, such that the displacement of the support elements and consequently the compression of the gaskets 5 and 6 is controlled by the thickness of the rigid block 8. The thickness of rigid block 8 is determined by the number of layers of laminations 8a that are stacked on one another. The rigid block 8 can be split apart by separating the laminations to obtain the thickness of rigid block 8 as is required, depending on the circumstances.

These laminations 8a constituting the splittable block 8 are of predetermined thickness, preferably 0.5 tenths of a millimeter.

The laminations are secured to one another by a slightly adhesive substance suitable for allowing them to be split apart and to be repositioned.

They may also be obtained using steel or copper foil.

In the present embodiment, the splittable block 8 has a frame whose shape and size are substantially identical to the outlines of the support elements 3 and 4 and which is obtained by being cut out from a blank of laminated sheets.

Nevertheless, the spacing derived from and given by the adjustable thickness of the splittable block 8 could alternatively be obtained by a plurality of spaced-apart spacers (not shown) disposed between the support elements 3 and 4, around their outer margins 3b and 4b, at the positions of the mechanical clamping means, and in particular at the positions of the screws 10 that pass through them. Applying the principle of the invention, such spacers would likewise be obtained by being cut out from a blank of laminated sheets.

It will easily be understood that the thickness of the splittable block 8 can be controlled in this way, thereby making it possible to control the extent to which the flexible gaskets 5 and 6 are compressed. Thus, it becomes possible to adjust the resonant frequency of vibration of the plate glass without interference with the resonant frequencies of the other mechanical parts, such as the support elements 3 and 4.

In the present case, the original thickness of the splittable block 8 is 1.6 mm, and slices of thickness 0.05 mm can be split off therefrom.

Vibration tests have been performed with various thicknesses of block after splitting.

The following table shows how the resonant frequency of the glass screen 2 varies as a function of block thickness.

| Thickness | Frequency |
| --- | --- |
| 1.2 mm | 583 Hz |
| 1.3 mm | 525 Hz |
| 1.4 mm | 510 Hz |
| 1.5 mm | 453 Hz |

This device fully guarantees that the mechanical characteristics of the screen 2 are reproducible in mass production. The manufacturing tolerances of the various parts are taken up by the blocks 8 of adjustable thickness, thereby guaranteeing an identical frequency response for each screen 2.

What is claimed is:

1. A display screen assembly comprising:
 a glass plate having first and second sides;
 first and second flexible gaskets disposed respectively on said first and second sides of the glass plate;
 first and second support elements each having at least a portion thereof adapted to abut against said first and second gaskets respectively;
 a rigid block of adjustable thickness adapted to be positioned between said first and second support elements; and
 clamping means for clamping said first and second support elements together so as to compress said rigid block therebetween and to compress said gaskets against said glass plate, said rigid block having its thickness adjustable to determine the extent to which said gaskets are compressed against said glass plate in order to adjust the resonant frequency of the glass plate without effecting the resonant frequency of the support elements.

2. An assembly according to claim 1, wherein the rigid block of adjustable thickness comprises a laminated assembly of sheets having a predetermined thickness, said laminated assembly of sheets capable of being split apart.

3. An assembly according to claim 2, wherein the sheets comprising the laminated assembly are secured to one another by an adhesive substance.

4. An assembly according to claim 2, wherein the rigid block is of a shape and size substantially identical to that of a peripheral portion of the support elements.

5. An assembly according to claim 4, wherein said clamping means comprising screws, the rigid block being provided with through holes for receiving said screws.

6. A device according to claim 5, wherein said screws each comprise a head for bearing against one of said support elements.

7. A device according to claim 5 wherein said screws each comprise a shark for passing through a respective one of said holes.

8. An assembly according to claim 2, wherein the laminated assembly comprises a stack of copper laminations.

9. An assembly according to claim 8, wherein the thickness of each of the laminations is 0.5 tenths of a millimeter.

10. An assembly according to claim 2, wherein the laminated assembly comprises a stack of steel laminations.

11. An assembly according to claim 1, wherein the rigid block comprises a plurality of spacers cut out from a blank of laminated sheets.

12. A display screen assembly comprising:
 a glass plate having first and second sides;
 first and second flexible gaskets, said first gasket adapted to be disposed along an outer periphery of the first side of said glass plate, said second gasket adapted to be disposed along an outer periphery of the second side of said glass plate;
 first and second support elements each having at least a portion thereof adapted to abut against said first and second gaskets respectively;
 a block of a predetermined number of laminated sheets being positioned between said first and second support elements; and
 means for clamping said first and second support elements together so as to compress said laminated sheets therebetween and to compress the gaskets against the glass plate with a predetermined force, said predetermined force being determined by the predetermined number of laminated sheets within said block.

13. An assembly according to claim 12, wherein said laminated sheets are secured to one another by an adhesive.

14. An assembly according to claim 12, wherein the block of said predetermined number of sheets has a size and shape substantially similar to that of a peripheral portion of the support elements.

15. An assembly according to claim 12, wherein said clamping means comprises screws, the block of said predetermined number of laminated sheets being provided with through holes for receiving said screws.

16. An assembly according to claim 12, wherein said laminated sheets comprise a copper material.

17. An assembly according to claim 12, wherein said laminated sheets comprise a steel material.

18. An assembly according to claim 12, wherein each of said laminated sheets has a thickness of about 0.05 millimeters.

* * * * *